Oct. 1, 1935. D. PYZEL, 4TH 2,015,816
MIRROR
Filed Feb. 9, 1932

INVENTOR.
Daniel Pyzel, IV.
BY Robert N. Eckhoff
ATTORNEY.

Patented Oct. 1, 1935

2,015,816

UNITED STATES PATENT OFFICE 2,015,816

MIRROR

Daniel Pyzel, 4th, Hollywood, Calif.

Application February 9, 1932, Serial No. 591,788

1 Claim. (Cl. 219—19)

This invention relates to an improved mirror which will not fog or mist when used in a very humid atmosphere, as in a bath or shower room. Those who have attempted to use a mirror in a bath room, particularly when the room is at all cold, have experienced the annoyance of having to dry the mirror frequently so as to be able to secure a clear and true reflection. When one shaves, this difficulty, besides being annoying, is really a hazard. In accordance with my invention, a mirror is available which will not fog or mist and so prevent the mirror from availing one of a true reflection.

It is in general the object of the present invention to provide a mirror which will not fog or mist and which will provide a clear and accurate reflection even tho used in a very humid atmosphere.

The invention possesses other objects and features of advantage, some of which, with the foregoing, will appear in the following wherein I have disclosed only the preferred form of mirror of my invention. It is to be understood that the form disclosed is only that at present preferred by me, and that other forms may be employed. The invention is generically applicable to other structures than mirrors.

In the drawing accompanying and forming a part of the specification:—

Figure 1:
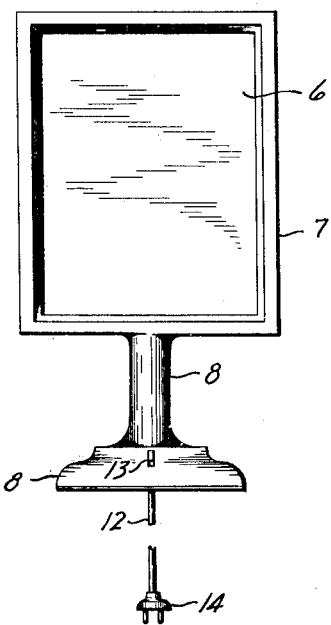
Fig. 1 is a view of the front of a mirror embodying my invention.
Figure 2:
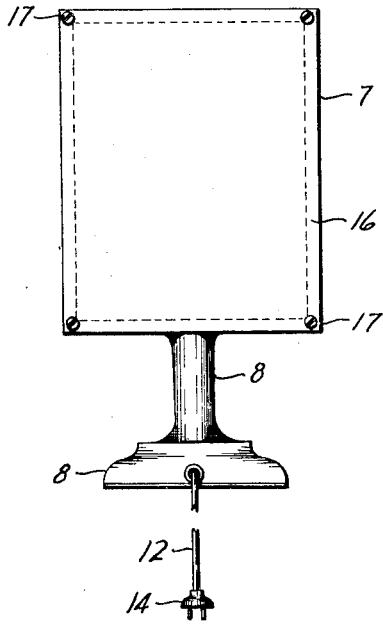
Fig. 2 is a rear view of the mirror shown in Fig. 1.
Figure 3:
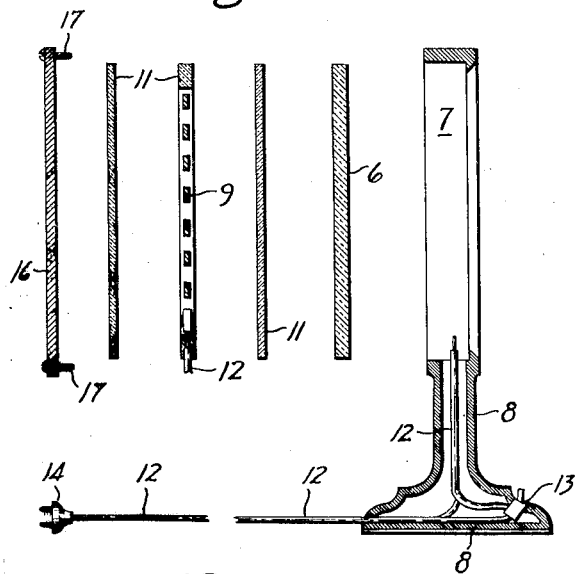
Fig. 3 is a view, partly in section, with the parts comprising the mirror exploded to illustrate the construction.

The invention has been successfully applied to a small portable mirror as I have shown in Figure 1 wherein a mirror 6 is mounted in a frame 7 on a base 8. The mirror is the usual sheet of plate glass treated on one side to provide a reflector. Of course, the invention is applicable to other mirrors, as those mounted on the wall or on doors.

In accordance with my invention I provide means for heating the mirror. I have found that a mirror heated to above the dew-point of the atmosphere will not become fogged and so prevented from reflecting. When the mirror is heated to above the dew-point, condensation of moisture does not occur upon the mirror surface and the surface is maintained clear and bright. Since the moisture content and room temperature may vary widely, I have found it desirable to heat the mirror to a fairly high temperature, so that the mirror is above the dew-point. I have employed a mirror heated to 160° F. successfully.

Figure 4:
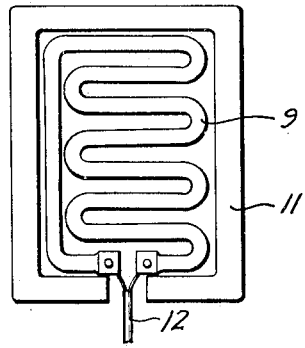
Fig. 4 is a plan view of a heating element for the mirror.

To heat the mirror I preferably employ an electric resistance element 9 (Fig. 4) wound in grid form of the usual flat, resistance material. This element is placed between sheets 11 of an insulating and refractory material, as mica, and inserted into frame 7 with one of the sheets of mica against the back of the mirror. Wires 12 are connected to the resistance element 9, to a switch 13 in the base 8 and to a plug 14 for insertion into an electrical fixture to supply current to the resistance element. The mirror, mica sheets and resistance element are retained in place by backing member 16 secured to frame 7 by screws 17 which retains the mirror, mica sheets, and resistance compressed so as to exclude moisture. These elements are of slightly greater total thickness than frame 7 so that they are compressed in the frame.

In use, with the plug 14 inserted in a suitable electrical fixture supplied with current, it is only necessary to switch on the current by pressing switch 13. Within an exceedingly short time, a minute or so, the mirror will be heating rapidly to above the dew-point and any moisture on the mirror will rapidly vanish while subsequent condensation is prevented as long as the mirror is heated. One using the mirror has a clear, even and unobscured surface in which to view his image. The fact that all the elements of the mirror are compressed together results not only in excluding moisture but also in a uniform heating of the mirror so that a clear, even and unobscured surface is available in which an image can be viewed.

I claim:

A mirror comprising a rim-like frame having a back and a face and a retaining flange substantially in the plane of said face; a unit insertable into said frame and including a mirror, a first insulating sheet against the back of said mirror, a heating element against said first sheet, a second insulating sheet against said element, said mirror, said element and said sheets being insertable into said frame from the back thereof so that said mirror is retained by said flange, a backing member lying against said second sheet, and means for securing said backing member removably to said frame to retain said unit in said frame.

DANIEL PYZEL, IV.